US010402696B2

(12) United States Patent
Cheng

(10) Patent No.: US 10,402,696 B2
(45) Date of Patent: Sep. 3, 2019

(54) SCENE OBSTRUCTION DETECTION USING HIGH PASS FILTERS

(71) Applicant: TEXAS INSTRUMENTS INCORPORATED, Dallas, TX (US)

(72) Inventor: Victor Cheng, Fort Lauderdale, FL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 85 days.

(21) Appl. No.: 15/398,006

(22) Filed: Jan. 4, 2017

(65) Prior Publication Data

US 2017/0193641 A1 Jul. 6, 2017

Related U.S. Application Data

(60) Provisional application No. 62/274,525, filed on Jan. 4, 2016.

(51) Int. Cl.

*G06K 9/00* (2006.01)
*G06K 9/46* (2006.01)
*G06K 9/62* (2006.01)
*G06T 7/00* (2017.01)

(52) U.S. Cl.

CPC ....... *G06K 9/6269* (2013.01); *G06K 9/00791* (2013.01); *G06K 9/4642* (2013.01); *G06T 7/0002* (2013.01); *G06T 2207/20081* (2013.01); *G06T 2207/30168* (2013.01); *G06T 2207/30252* (2013.01)

(58) Field of Classification Search

CPC ................ G06T 7/0002; G06K 9/4642; G06K 9/00791; G06K 9/6269

See application file for complete search history.

(56) References Cited

U.S. PATENT DOCUMENTS

| | | | | | |
|---|---|---|---|---|---|
| 6,067,369 | A * | 5/2000 | Kamei | G06K 9/00087 | 382/125 |
| 6,611,608 | B1 * | 8/2003 | Wu | G06T 1/0028 | 382/100 |
| 8,532,360 | B2 * | 9/2013 | Suri | A61B 8/483 | 382/131 |
| 9,041,718 | B2 * | 5/2015 | Matthews | G06T 13/20 | 345/420 |
| 9,269,019 | B2 * | 2/2016 | Liao | G06K 9/4652 | |
| 9,448,636 | B2 * | 9/2016 | Balzacki | G06F 3/017 | |
| 9,466,123 | B2 * | 10/2016 | Liao | G06K 9/4652 | |
| 9,690,982 | B2 * | 6/2017 | Bulzacki | G06F 3/017 | |
| 9,762,800 | B2 * | 9/2017 | Tsubaki | H04N 5/23287 | |
| 9,838,643 | B1 * | 12/2017 | Madhav | H04N 5/911 | |
| 2002/0031268 | A1 * | 3/2002 | Prabhakar | G06K 9/00456 | 382/224 |
| 2003/0156733 | A1 * | 8/2003 | Zeller | G06T 1/0078 | 382/100 |

(Continued)

*Primary Examiner* — Mia M Thomas

(74) *Attorney, Agent, or Firm* — Kenneth Liu; Charles A. Brill; Frank D. Cimino

(57) ABSTRACT

Advanced driver assistance systems need to be able to operate under real time constraints, and under a wide variety of visual conditions. The camera lens may be partially or fully obstructed by dust, road dirt, snow etc. The invention shown extracts high frequency components from the image, and is operable to classify the image as being obstructed or non-obstructed.

18 Claims, 4 Drawing Sheets

(56) References Cited

U.S. PATENT DOCUMENTS

| | | | | | |
|---|---|---|---|---|---|
| 2005/0069207 | A1* | 3/2005 | Zakrzewski | B64D 45/0015 | 382/190 |
| 2006/0020958 | A1* | 1/2006 | Allamanche | G10L 25/48 | 725/19 |
| 2006/0123051 | A1* | 6/2006 | Hofman | G06K 9/3258 | |
| 2006/0187305 | A1* | 8/2006 | Trivedi | G06K 9/00234 | 348/169 |
| 2006/0239537 | A1* | 10/2006 | Shragai | G06K 9/0063 | 382/154 |
| 2007/0014435 | A1* | 1/2007 | Mirowski | G01V 11/00 | 382/109 |
| 2007/0014443 | A1* | 1/2007 | Russo | G06K 9/00114 | 382/124 |
| 2007/0081698 | A1* | 4/2007 | Hamid | G06K 9/00046 | 382/124 |
| 2008/0031538 | A1* | 2/2008 | Jiang | H04N 1/4092 | 382/261 |
| 2008/0063287 | A1* | 3/2008 | Klamer | G11B 27/031 | 382/232 |
| 2008/0208577 | A1* | 8/2008 | Jeong | G10L 15/32 | 704/231 |
| 2009/0067742 | A1* | 3/2009 | Lim | G06T 5/003 | 382/263 |
| 2009/0074275 | A1* | 3/2009 | O Ruanaidh | G06T 7/0081 | 382/128 |
| 2009/0161181 | A1* | 6/2009 | Xu | H04N 1/113 | 358/505 |
| 2009/0226052 | A1* | 9/2009 | Fedele | G06K 9/00046 | 382/125 |
| 2011/0096201 | A1* | 4/2011 | Yoo | G06T 5/007 | 348/235 |
| 2011/0222783 | A1* | 9/2011 | Matsunobu | G06T 3/403 | 382/218 |
| 2011/0257505 | A1* | 10/2011 | Suri | A61B 6/504 | 600/408 |
| 2011/0257545 | A1* | 10/2011 | Suri | A61B 5/02007 | 600/508 |
| 2012/0040312 | A1* | 2/2012 | Hinders | A61B 8/0875 | 433/215 |
| 2012/0099790 | A1* | 4/2012 | Lyuh | G06K 9/3241 | 382/170 |
| 2012/0114226 | A1* | 5/2012 | Kameyama | G06K 9/00221 | 382/155 |
| 2012/0128238 | A1* | 5/2012 | Kameyama | G06T 3/4053 | 382/159 |
| 2012/0134556 | A1* | 5/2012 | Kono | G06T 7/0012 | 382/128 |
| 2012/0134579 | A1* | 5/2012 | Kameyama | G06T 3/4053 | 382/159 |
| 2012/0239104 | A1* | 9/2012 | Rosenberg | A61B 5/02028 | 607/20 |
| 2012/0269445 | A1* | 10/2012 | Matsunobu | G06T 3/403 | 382/199 |
| 2013/0177235 | A1* | 7/2013 | Meier | G06T 15/00 | 382/154 |
| 2013/0282208 | A1* | 10/2013 | Mendez-Rodriguez | G01S 17/89 | 701/16 |
| 2014/0294262 | A1* | 10/2014 | Schuckers | G06K 9/00114 | 382/125 |
| 2014/0301487 | A1* | 10/2014 | Laroche | H04N 19/176 | 375/240.29 |
| 2015/0208958 | A1* | 7/2015 | Kaku | A61B 5/1459 | 600/339 |
| 2015/0332441 | A1* | 11/2015 | Hogasten | H04N 5/2257 | 348/148 |
| 2016/0165101 | A1* | 6/2016 | Akiyama | H04N 5/23229 | 348/187 |
| 2016/0301909 | A1* | 10/2016 | Yu | G06T 7/0002 | |
| 2016/0371567 | A1* | 12/2016 | Hiasa | G06K 9/6267 | |
| 2017/0004352 | A1* | 1/2017 | Jonsson | G06K 9/00114 | |
| 2017/0181649 | A1* | 6/2017 | Carter | A61B 5/02108 | |
| 2017/0193641 | A1* | 7/2017 | Cheng | G06K 9/00791 | |
| 2018/0122398 | A1* | 5/2018 | Sporer | G10L 21/0208 | |
| 2018/0268262 | A1* | 9/2018 | Osada | G06K 9/6269 | |

* cited by examiner

SCENE OBSTRUCTION DETECTION USING HIGH PASS FILTERS

CLAIM OF PRIORITY

This application claims priority under 35 U.S.C 119(e)(1) to U.S. Provisional Application No. 62/274,525 filed on Jan. 4, 2016.

TECHNICAL FIELD OF THE INVENTION

The technical field of this invention is image processing, particularly to detect if the view of a fixed focus camera lens is obstructed by surface deposits (dust, road dirt, etc).

BACKGROUND OF THE INVENTION

The fixed focus cameras used for Advanced Driver Assistance Systems (ADAS) are subject to many external conditions that may make the lens dirty from time to time. Car manufacturers are starting to design intelligent self-cleaning cameras that can detect dirt and automatically clean the lens using air or water.

One of the difficulties encountered in the prior art is the reliable detection of foreign objects such as dust, road dirt, snow, etc., obscuring the lens while ignoring large objects that are part of the scene being viewed by the cameras.

SUMMARY OF THE INVENTION

The solution shown applies to fixed focus cameras, widely used in automotive for ADAS applications. The problem solved by this invention is distinguishing a scene obscured by an obstruction, such as illustrated in FIG. 1, from a scene having large homogeneous areas, such as illustrated in FIG. 2. In accordance with this invention the distinction is made based upon the picture data produced by the camera. Obstructions created by deposits on a lens surface, as shown in FIG. 1, will appear blurred and will have predominantly low frequency content. A high pass filter may therefore be used to detect the obstructions.

A machine-learning algorithm is used to implement classification of the scene in this invention.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
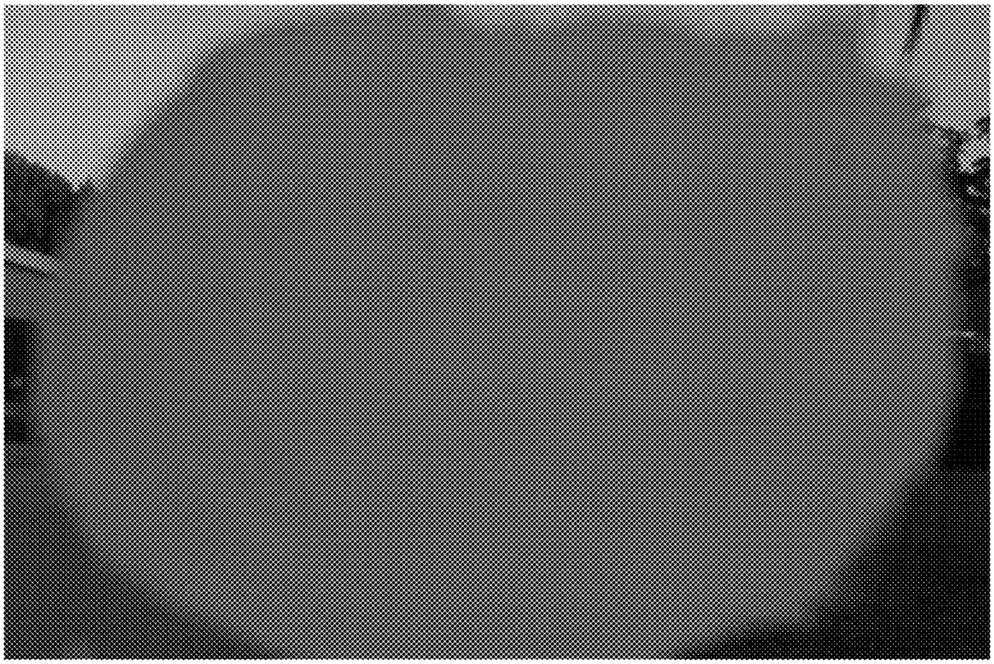
FIG. 1 shows a partially obstructed scene due to an obstruction on the lens.
Figure 2:
FIG. 2 shows the same scene without an obstruction of the lens.
Figure 3:
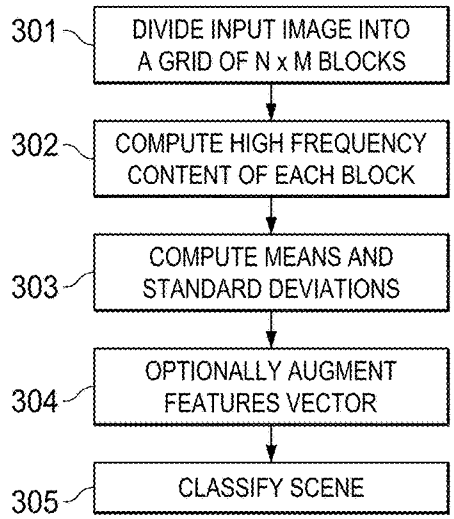
FIG. 3 shows a block diagram of the functions performed according to this invention.
Figure 4:
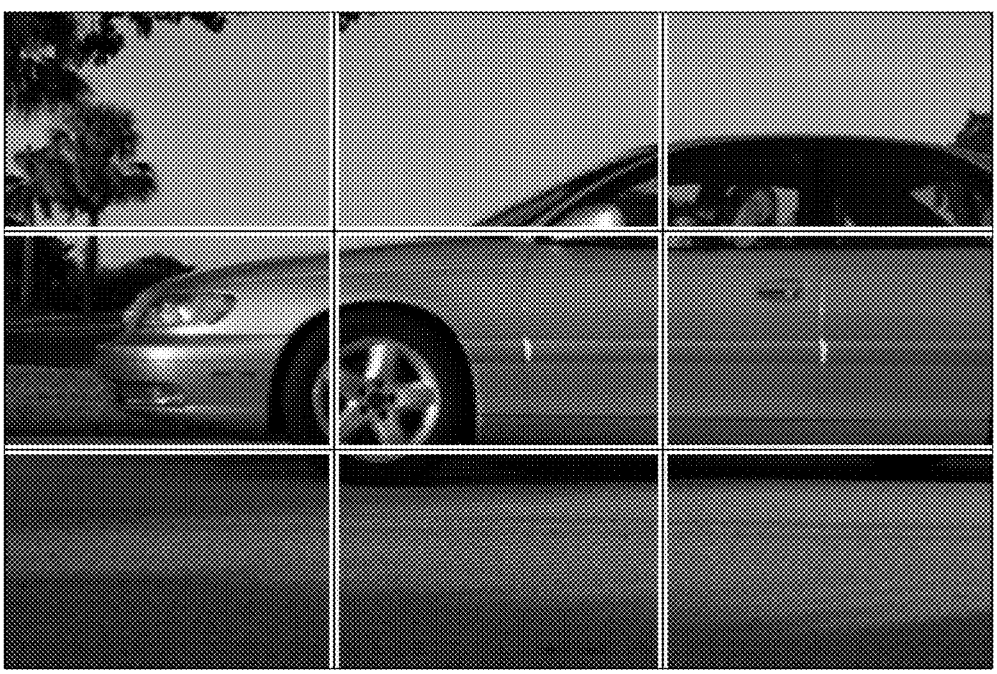
FIG. 4 shows the scene of FIG. 2 divided into a grid of blocks.

The steps required to implement the invention are shown in FIG. 3. The input image is first divided into a grid of N×M blocks in step 301. FIG. 4 illustrates the scene of FIG. 2 divided into a 3×3 set of blocks.

In step 302 the high frequency content of each block is computed by using horizontal and vertical high pass filters. This produces a total of 2×M×N values.

The reason for separately processing 3×3 (9) different regions of the image instead of the entire image is to calculate the standard deviation of the values across the image. The Example embodiments of this invention use both mean and standard deviation values in classifying a scene. Employing only the mean value could be sufficient to detect scenarios where the entire view is blocked but cannot prevent false positive cases where one part of the image is obstructed and other parts are perfectly fine. The mean value cannot measure the high frequency's contrast between different regions whereas the standard deviation can.

Step 303 then calculates the mean and the standard deviation for each high pass filter, across M×N values to form a 4 dimensional feature vector. Step 304 is an optional step that may augment the feature vector using an additional P component. This additional component may be meta information such as image brightness, temporal differences, etc.

Step 305 then classifies the scene as obscured or not obscured using a logistic regression algorithm having the feature vector as its input. This algorithm is well suited for binary classifications such as pass/fail, win/lose, or in this case blocked/not blocked.

Figure 5:
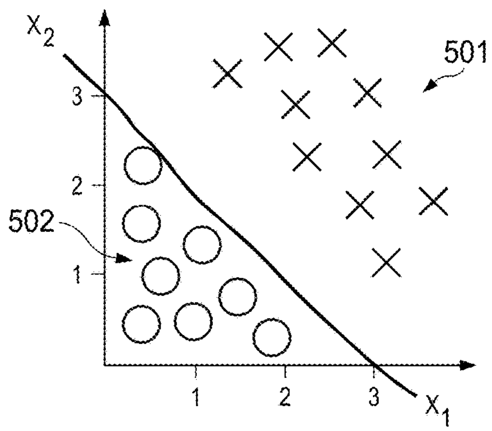
FIG. 5 is a graphical representation of a feature vector.

This algorithm performs well where the two classes can be separated by a decision boundary in the form of a linear equation. Classification is shown in FIG. 5, where:

If $\theta_0+\theta_1 \cdot x_1+\theta_2 \cdot x_2 \geq 0$ then the $(x_1,x_2)$ sample belongs to the X class 501 (image blocked) illustrated in FIG. 5, and If $\theta_0+\theta_1 \cdot x_1+\theta_2 \cdot x_2<0$ then the $(x_1,x_2)$ sample belongs to the O class 502 (image clear) illustrated in FIG. 5.

In this invention the line is parameterized by $\theta=[\theta_0,\theta_1,\theta_2]$ since the feature vector has two components $x_1$ and $x_2$. The task of the logistic regression is to find the optimal $\theta$, which will minimize the classification error for the images used for training. In the case of scene obstruction detection, the feature vectors have 4 components $[x_1, x_2, x_3, x_4]$ and thus the decision boundary is in form of a hyperplane with parameters $[\theta_0, \theta_1, \theta_2, \theta_3, \theta_4]$.

The training algorithm determines the parameter $\theta=[\theta_0, \theta_1,\theta_2 \ldots]$ by performing the following tasks:

Gather all feature vectors into a matrix X and the corresponding classes into a vector Y.

$$X = \begin{Bmatrix} X_1^0 & X_1^1 & \ldots & X_1^{M-1} \\ X_2^0 & X_2^1 & \ldots & X_2^{M-1} \\ X_3^0 & X_3^1 & \ldots & X_3^{M-1} \\ X_4^0 & X_4^1 & \ldots & X_4^{M-1} \end{Bmatrix} = [X^0 X^1 \ldots X^{M-1}]$$

$$Y = [y^0 y^1 \ldots y^{M-1}] \text{ where } y^k \text{ is 0 or 1.}$$

Find $\theta=[\theta_0, \theta_1, \theta_2, \theta_3, \theta_4]$ that minimizes the cost function:

$$J(\Theta) = \frac{1}{M}\sum_{k=0}^{M-1} \mathrm{Cost}(h_\Theta(X^k), y^k)$$

-continued with:

$$\mathrm{Cost}(h_\Theta(X^k), y^k) = -y^k\log(h_\Theta(X^k)) - (1-y^k)\log(1-h_\Theta(X^k)) \text{ and}$$

$$h_\Theta(X^k) = \frac{1}{1+e^{-\Theta^T x^k}}$$

Figure 6:
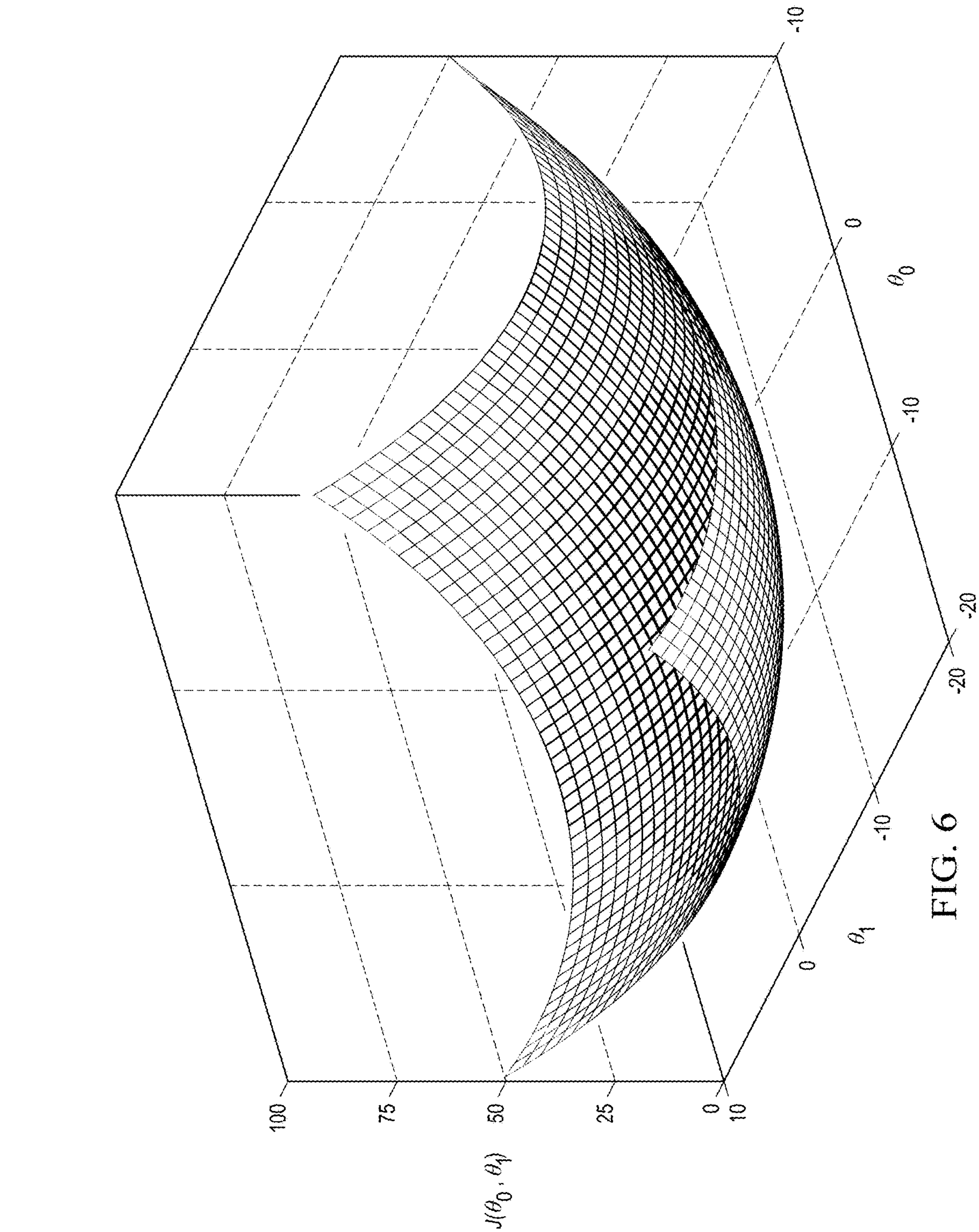
FIG. 6 is a graphical representation of a sample cost function for the case of a one dimensional feature vector.

FIG. 6 shows the graphical representation of a sample cost function J(θ) for the case of a one dimensional feature vector.

Gradient descent is one of the techniques to find the optimum θmin which minimizes J(θ).

If for θmin we have Jθmin=0, this means the error rate for the classifier, when applied to the training data set, is 0%. However most of the time J(θmin)>0, which means there is some miss-classification error that can be quantified.

Next the algorithm's miss-classification error (also called accuracy) is calculated by applying the classifier rule to every feature vector of the dataset and comparing the results with the true result.

The final classification is done as follows:

If $\theta_0+\theta_1\cdot x_1+\theta_2\cdot x_2\geq 0$ then the image is blocked, and If $\theta_0+\theta_1\cdot x_1+\theta_2\cdot x_2<0$ then the image is clear.

Figure 7:
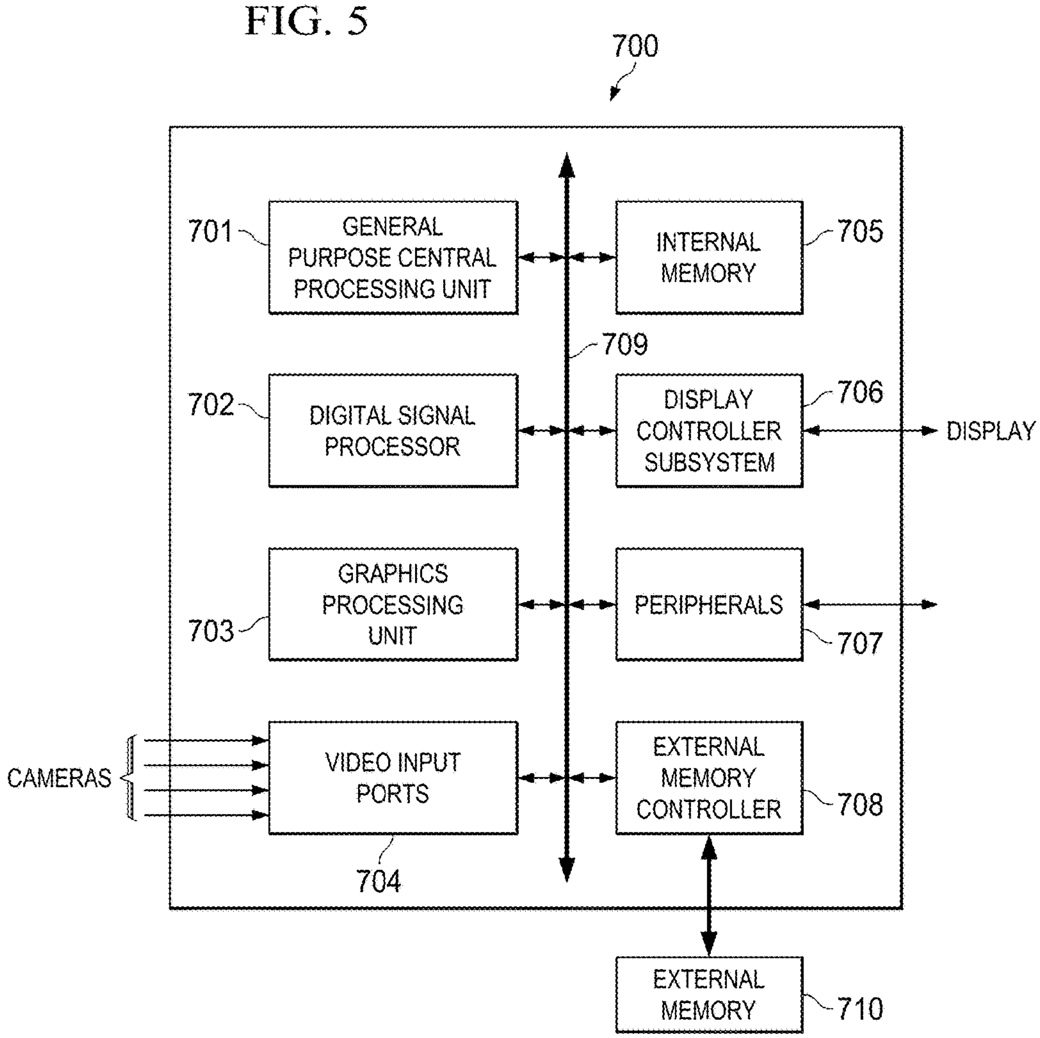
FIG. 7 shows a processor operable to implement this invention.

FIG. 7 illustrates an example system-on-chip (SOC) 700 suitable for this invention. SOC 700 includes general purpose central processing unit (CPU) 701, digital signal processor (DSP) 702, graphics processing unit (GPU) 703, video input ports 704, internal memory 705, display controller subsystem 706, peripherals 707 and external memory controller 708. In this example, all these parts are bidirectionally connected to a system bus 709. General purpose central processing unit 701 typically executes what is called control code. Control code is what gives SOC 700 its essential character generally in the way it interacts with the user. Thus CPU 701 controls how SOC 700 responds to user inputs (typically received via peripherals 707). DSP 702 typically operates to process images and real-time data. These processes are typically known as filtering. The processes FIG. 3 are performed by DSP 702. GPU 703 performs image synthesis and display oriented operations used for manipulation of the data to be displayed. Video input ports 704 receive the input images from possibly plural cameras. Video input ports 704 typically also includes suitable buffering of the image data prior to processing. Internal memory 705 stores data used by other units and may be used to pass data between units. The existence of memory 705 on SOC 700 does not preclude the possibility that CPU 701, DSP 702 and GPU 703 may include instruction and data cache. Display controller subsystem 706 generates the signals necessary to drive the external display used by the system. Peripherals 707 may include various parts such as a direct memory access controller, power control logic, programmable timers and external communication ports for exchange of data with external systems (as illustrated schematically in FIG. 7). External memory controller 708 controls data movement into and out of external memory 710.

A typical embodiment of this invention would include non-volatile memory as a part of external memory 710. The instructions to control SOC 700 to practice this invention are stored the non-volatile memory part of external memory 710. As an alternate, these instruction could be permanently stored in non-volatile memory part of external memory 710.

What is claimed is:

1. An image processing system comprising:

a memory to store instructions; and a processor having an input to receive an input image corresponding to a scene and an output, the processing being configured to execute the instructions to perform scene obstruction detection on the input image by:

dividing the input image into a plurality of blocks;

applying horizontal and vertical high pass filtering to obtain, for each block, a respective horizontal high frequency content (HFC) value and a respective vertical HFC value;

determining a first mean and a first standard deviation based on the horizontal HFC values of the blocks;

determining a second mean and a second standard deviation based on the vertical HFC values of the blocks;

forming a multi-dimensional feature vector having components corresponding at least to the first mean, the first standard deviation, the second mean, and the second standard deviation;

classifying the input image as either obstructed or unobstructed by comparing a value determined as a combination of one or more predetermined parameters and the components of the feature vector to a decision boundary threshold, wherein the classification of the input image as either obstructed or unobstructed is based on a result of the comparison of the value to the decision boundary threshold; and outputting, by the output, a result of the classification.

2. The image processing system of claim 1, wherein the one or more predetermined parameters are selected based on a cost function.

3. The image processing system of claim 1, wherein the combination is based on a linear combination.

4. The image processing system of claim 1, wherein a total number of the one or more predetermined parameters is one more than a total number of the components of the feature vector.

5. The image processing system of claim 1, wherein the one or more predetermined parameters parametrize the decision boundary threshold.

6. The image processing system of claim 5, wherein the decision boundary threshold is in the form of a hyperplane.

7. The image processing system of claim 1, wherein dividing the input image into the plurality of blocks comprises dividing into a grid of M blocks by N blocks, wherein at least one of M or N is an integer greater than 1, and wherein a total number of the plurality of blocks is equal to M×N.

8. The image processing system of claim 7, wherein M is equal to N.

9. The image processing system of claim 7, wherein each block is the same size.

10. The image processing system of claim 1, wherein the classification is a binary classification.

11. The image processing system of claim 1, wherein the processor comprises a digital signal processor.

12. The image processing system of claim 1, comprising an image capture device to acquire the input image corresponding to the scene.

13. The image processing system of claim 12, wherein the image capture device is a video camera.

14. The image processing system of claim 13, wherein the video camera is a fixed focus camera.

15. The image processing system of claim 1, wherein the image processing system is part of an advanced driver assistance system for an automobile.

16. An image processing system comprising:

a memory to store instructions; and a processor having an input to receive an input image corresponding to a scene and an output, the processing being configured to execute the instructions to perform scene obstruction detection on the input image by:

dividing the input image into a plurality of blocks;

applying horizontal and vertical high pass filtering to obtain, for each block, a respective horizontal high frequency content (HFC) value and a respective vertical HFC value;

determining a first mean and a first standard deviation based on the horizontal HFC values of the blocks;

determining a second mean and a second standard deviation based on the vertical HFC values of the blocks;

forming a multi-dimensional feature vector having components corresponding at least to the first mean, the first standard deviation, the second mean, and the second standard deviation;

classifying the input image as either obstructed or unobstructed by comparing a value computed based on the components of the feature vector to a decision boundary threshold, wherein the classification of the input image as either obstructed or unobstructed is based on a result of the comparison of the value to the decision boundary threshold, wherein the input image is classified as unobstructed when the value is less than the decision boundary threshold and is classified as obstructed when the value is greater than or equal to the decision boundary threshold; and outputting, by the output, a result of the classification.

17. An image processing system comprising:

a memory to store instructions; and a processor having an input to receive an input image corresponding to a scene and an output, the processing being configured to execute the instructions to perform scene obstruction detection on the input image by:

dividing the input image into a plurality of blocks;

applying horizontal and vertical high pass filtering to obtain, for each block, a respective horizontal high frequency content (HFC) value and a respective vertical HFC value;

determining a first mean and a first standard deviation based on the horizontal HFC values of the blocks;

determining a second mean and a second standard deviation based on the vertical HFC values of the blocks;

forming a multi-dimensional feature vector having components corresponding at least to the first mean, the first standard deviation, the second mean, and the second standard deviation, wherein forming the multi-dimensional feature vector having the components corresponding at least to the first mean, the first standard deviation, the second mean, and the second standard deviation further includes adding at least one additional component to the feature vector;

classifying the input image as either obstructed or unobstructed by comparing a value computed based on the components of the feature vector to a decision boundary threshold, wherein the classification of the input image as either obstructed or unobstructed is based on a result of the comparison of the value to the decision boundary threshold; and outputting, by the output, a result of the classification.

18. The image processing system of claim 17, wherein the at least one additional component includes one or more of image brightness information, meta information, or temporal difference information.

* * * * *